(12) United States Patent
Sharma et al.

(10) Patent No.: US 9,119,226 B2
(45) Date of Patent: Aug. 25, 2015

(54) ARCHITECTURE FOR CONTENT AND HOST-CENTRIC INFORMATION DISSEMINATION IN DELAY-TOLERANT MANETS

(71) Applicant: Massachusetts Institute Of Technology, Cambridge, MA (US)

(72) Inventors: Praveen Sharma, Ashland, MA (US); Jason Biddle, Somerville, MA (US); Aaron Daubman, Billerica, MA (US); Evan Fiore, Chelmsford, MA (US); Timothy Gallagher, Westford, MA (US); Jeremy Mineweaser, Bedford, MA (US); Santiago Paredes, Chelmsford, MA (US); Daniel Souza, Cambridge, MA (US); Heather Zwahlen, Arlington, MA (US); Maximillian Merfield, Arlington, MA (US); Larry Robinson, Pepperell, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 190 days.

(21) Appl. No.: 13/860,181

(22) Filed: Apr. 10, 2013

(65) Prior Publication Data
US 2013/0272286 A1      Oct. 17, 2013

Related U.S. Application Data

(60) Provisional application No. 61/623,807, filed on Apr. 13, 2012.

(51) Int. Cl.
*H04W 84/18*      (2009.01)
*H04W 40/30*      (2009.01)
*H04L 12/725*     (2013.01)
*H04L 12/717*     (2013.01)

(52) U.S. Cl.
CPC ............. *H04W 84/18* (2013.01); *H04L 45/306* (2013.01); *H04L 45/42* (2013.01); *H04W 40/30* (2013.01)

(58) Field of Classification Search
USPC ................... 370/338, 236, 406; 709/219, 229
See application file for complete search history.

(56) References Cited

U.S. PATENT DOCUMENTS

| | | | |
|---|---|---|---|
| 2002/0191573 A1* | 12/2002 | Whitehill et al. | 370/338 |
| 2004/0249768 A1* | 12/2004 | Kontio et al. | 705/65 |
| 2008/0198865 A1* | 8/2008 | Rudnick et al. | 370/406 |
| 2009/0287835 A1* | 11/2009 | Jacobson | 709/229 |
| 2010/0142421 A1* | 6/2010 | Schlicht et al. | 370/310 |
| 2010/0185753 A1* | 7/2010 | Liu et al. | 709/219 |
| 2012/0309425 A1* | 12/2012 | El Khayat et al. | 455/456.3 |
| 2012/0314580 A1* | 12/2012 | Hong et al. | 370/236 |

* cited by examiner

*Primary Examiner* — Albert T Chou
(74) *Attorney, Agent, or Firm* — Nields, Lemack & Frame, LLC (57) ABSTRACT

An architecture to enable delay tolerant content-centric and host-centric communications in MANETs comprised of smart phones is disclosed. This architecture allows cross network communications and Internet sharing, assuming that at least one of the smart phones has internet connectivity. The architecture includes a routing mechanism for content-centric communications, as well as routing algorithms for host-centric communications. In one embodiment, a combination of OLSR and a modified variant of PRoPHET is used to create preferred routing paths for content-centric communication. In another embodiment, variations of store and forward, such as binary spray and wait, are used for host-centric communications. These communications between mobile devices utilize wireless communications, such as IEEE802.11.

15 Claims, 10 Drawing Sheets

$$P'_{A,B} = \begin{cases} 1 & A = MPR \\ P_{A,B} & Otherwise \end{cases} \quad (1)$$

$$P_{A,B} = P_{A,B\,old} + (1 - P_{A,B\,old}) * P\_encounter \quad (2)$$
$$\text{where } P\_encounter = .75$$

$$P_{A,B} = P_{A,B\,old} * gamma^k \quad (3)$$
$$\text{where } gamma = 0.999$$

A, B: Phones communicating
MPR: Multipoint relays
P_encounter: Probability of phone A encountering phone B
Gamma: Aging constant
K: Number of time slots since last encounter
$P'_{A,B}$: Delivery predictability of the modified CCN algorithm
$P_{A,B}$: Delivery predictability of the original CCN algorithm

FIGURE 10

ARCHITECTURE FOR CONTENT AND HOST-CENTRIC INFORMATION DISSEMINATION IN DELAY-TOLERANT MANETS

This application claims priority of U.S. Provisional Application Ser. No. 61/623,807, filed Apr. 13, 2012, the disclosure of which is incorporated by reference in its entirety.

This invention was made with government support under Grant No. FA8721-02-C-0002 awarded by the U.S. Air Force. The government has certain rights in this invention.

BACKGROUND

The usage of mobile communication devices, such as mobile phones, has become ubiquitous. In fact, it is estimated that roughly 50% of the US population uses a smart phone. Mobile communication devices have a large drawback, in that they rely on a fixed network infrastructure of cellular towers, wireless routers, and other devices to operate. Consequently, these mobile communications device may be inoperative in the event that the infrastructure is unavailable, such as during a power outage or a natural disaster.

One method that has been proposed to overcome this shortcoming is the use of Mobile Ad-Hoc Networks (MANETs). These MANETs utilize a multi-hop network in which a mobile communications device communicates with one or more of its neighbors, which then forward the information until it reaches the desired destination. However, MANETs may not robustly handle intermittency, delays or service disruptions. In order to overcome these issues, it has been shown that a MANET may be overlaid with a Delay Tolerant Network (DTN).

In the event of a disaster, a user may wish to send a message to a specific destination, such as a message asking about the status of another person. However, in other cases, the user simply wants to request information for others to consume or seek information that others have produced. For example, a trapped or isolated user may want anyone in the area to receive their plea for help.

These two scenarios give rise to two different paradigms; host-centric communications and content-centric communications. Host-centric communications are communications in which the sender knows the address of the destination, such as a telephone number or IP address, and includes that destination address in the communication. In content-centric communications, the publisher/producer of content tags the information with a set of attributes, and disseminates it to the network. The subscribers in the network that are interested in those attributes consume the information.

It would be beneficial, especially during disaster responses, to have delay tolerant MANETs that are capable of handling both host-centric and content-centric communications and that can operate on easily available mobile devices, such as smart phones.

SUMMARY

An architecture to enable delay tolerant content-centric and host-centric communications in MANETs comprised of smart phones is disclosed. This architecture allows cross network communications and Internet sharing, assuming that at least one of the smart phones has internet connectivity. The architecture includes a routing mechanism for content-centric communications, as well as routing algorithms for host-centric communications. In one embodiment, a combination of OLSR and a modified variant of PRoPHET is used to create preferred routing paths for content-centric communication. In another embodiment, variations of store and forward, such as binary spray and wait, are used for host-centric communications. These communications between mobile devices utilize wireless communications, such as IEEE802.11.

DETAILED DESCRIPTION

Figure 1:
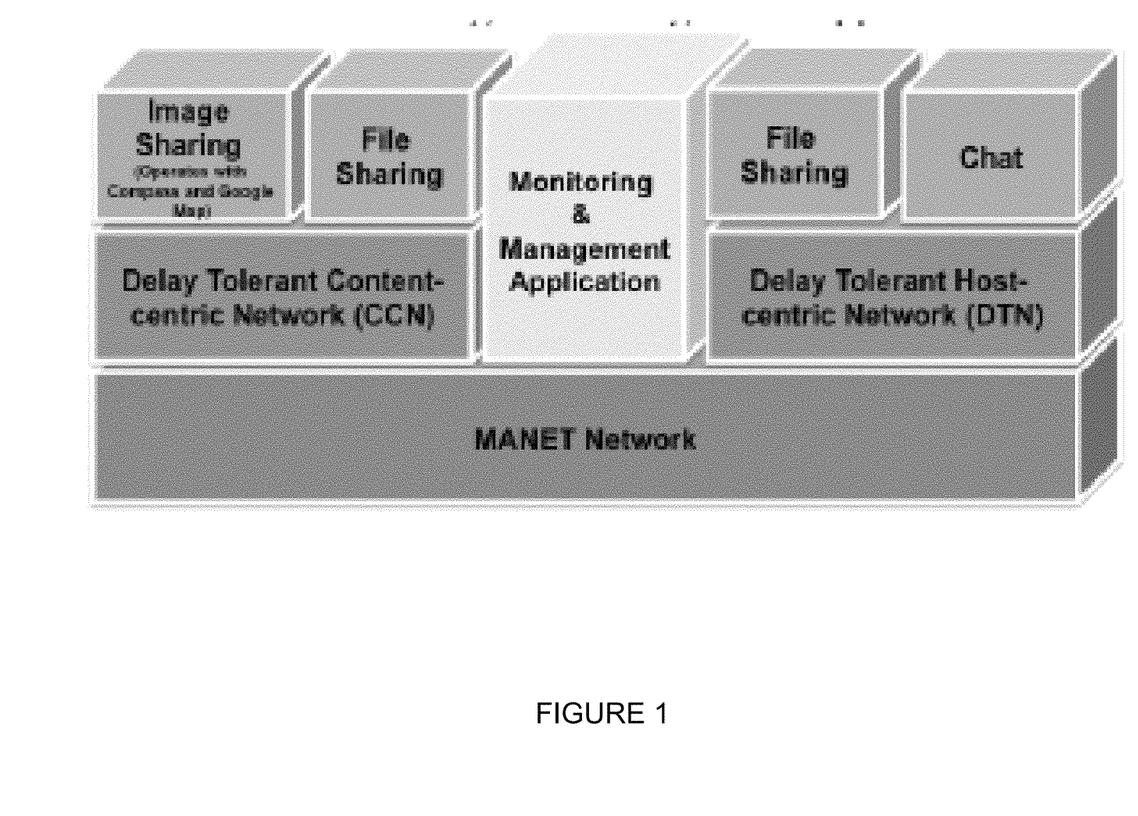
FIG. 1 shows an architecture which supports both host-centric and content-centric communications.

FIG. 1 shows a software architecture that may be used in conjunction with one embodiment in which both host-centric and content-concentric communications are supported. In other embodiments, the software may not include all of these components. For example, in certain embodiments, only one of these two types of communications may be supported. This software is designed to be executed on a mobile communications device, such as a smart phone, tablet or other suitable device. These devices contain a processing element, such as a microprocessor or other controller. In communication with the controller is a storage element, which typically contains both volatile and non-volatile storage. The storage element is used to contain the instructions executed by the processing unit, including the software described in FIG. 1. The mobile communications device also has wireless network capability, such as WiFi capability.

In FIG. 1, the lowest software layer is the MANET network layer. This layer enables mobile ad-hoc network capabilities on a device, such as a smart phone, such that the devices can disseminate information even when they are not connected to a wired or wireless infrastructure.

Above the MANET network layer is a Delay Tolerant Content-Centric Network layer (CCN) and a Delay Tolerant Host-Centric Network layer (DTN). The CCN and DTN overlays allow delay-tolerant content-centric and host-centric communications, respectively, to occur over the MANET.

Above the CCN and DTN layers are a set of illustrative applications that utilize these two services. For example, chat and file-sharing may be used in a host-centric communication paradigm. Chat may be similar to SMS, in that users send messages to specific destinations.

Image-sharing and file-sharing may be used for content-centric communications. For Image sharing, publishers may embed metadata, such as attributes describing the imagery, to the images. The consumers then acquire the content if the metadata matches areas of interest. In some cases, GPS tags may be embedded so that the consumers can determine the location of the image, such as by using GPS.

In addition, a monitoring and management application may be used. This application may not be included in all embodiments. In those embodiments which include the monitoring and management application, this application may be used for test purposes, debugging and other functions. For example, the monitoring application has the ability to display the network topology of 1-hop, 2-hops, all reachable nodes and gateways in a variety of formats. In addition, the management application may have several capabilities, such as:

- Configuring the WiFi: enabling the setting of IP addresses, SSIDs, frequency channels, and transmission power. Note that wireless ad-hoc mode enables smart phones to communicate in a single-hop peer-to-peer manner using the MAC layer, and this mode is a prerequisite for a MANET network to function on a smart phone.
- Configuring the MANET and CCNs: enables starting and stopping of MANET and CCN. It also activates Network Address Translation (NAT) on the gateway nodes and allows configuration and parameter changes for MANETs.
- Executing Command-line arguments such as ping and tcpdump.

The above software architecture can be implemented on any suitable device. In one embodiment, a plurality of smart phones was used to implement and test the present architecture. In contrast, almost all previous research in this field has been accomplished based on simulations and emulations. This architecture has been field-tested on actual wireless devices.

Each of the layers shown in FIG. 1 will be described in greater detail. The lowest layer, the MANET network layer, provides connectivity to other devices. MANET networks provide peer-to-peer and multi-hop communications in a self-configuring network of mobile communications devices. MANETs may use different protocols to determine network topologies. Proactive protocols continuously look for a route amidst the rapidly changing network topology. Reactive protocols only seek a route on demand when a communication is to be transmitted. Hybrid protocols use proactive neighbor sensing at the formation of the MANET, then use reactive protocols thereafter.

A proactive protocol known as Optimized Link State Routing (OLSR) is used in one embodiment. OLSR is a link-state routing protocol, which uses "Hello" and topology control (TC) messages to discover and then disseminate link state information throughout the mobile ad-hoc network. Individual nodes use this topology information to compute next hop destinations for all nodes in the network using shortest hop forwarding paths. Using "Hello" messages, the OLSR protocol at each node discovers 2-hop neighbor information and performs a distributed election of a set of multipoint relays (MPRs). Nodes select MPRs such that there exists a path to each of its 2-hop neighbors via a node selected as an MPR. These MPR nodes then source and forward TC messages that contain the MPR selectors. This technique minimizes the amount of flooding that occurs as described later.

Likewise, several protocols exist for supporting delay-tolerant communications. One such protocol is known as Probabilistic Routing Protocol using History of Encounters and Transitivity (PRoPHET). This routing protocol uses the history of exchanges to determine preferred routing paths. The delivery predictability between nodes A and B is expressed as P(A,B). The calculation of the delivery predictabilities has three parts. When two nodes, such as node A and B, meet, initially, they update the delivery predictability for each other, so that nodes that are often encountered have a high delivery predictability. This calculation is shown in Equation 1, where $0 \le P\_encounter \le 1$ is an initialization constant.

$$P(A,B) = P(A,B)_{old} + (1 - P(A,B)_{old}) * P\_encounter \quad (1)$$

If a pair of nodes do not encounter each other during a predetermined time interval, they are less likely to be good forwarders of information to each other. Therefore, the delivery predictability values must age, being reduced in the process. The aging equation is shown in Equation 2, where $0 \le gamma \le 1$ is the aging constant, and K is the number of time units that have elapsed since the last time the metric was aged. The time unit used can differ, and may be defined based on the application and the expected delays in the targeted network.

$$P(A,B) = P(A,B)_{old} * gamma^K \quad (2)$$

The delivery predictability also has a transitive property, that is based on the observation that if node A frequently encounters node B, and node B frequently encounters node C, then node C probably is a good node to forward information destined for node A to. Equation 3 shows how this transitivity affects the delivery predictability, where $0 <= beta <= 1$ is a scaling constant that controls how large an impact the transitivity should have on the delivery predictability.

$$P(A,C) = P(A,C)_{old} + (1 - P(A,C)_{old}) * P(A,B) * P(B,C) * beta \quad (3)$$

Figure 10:
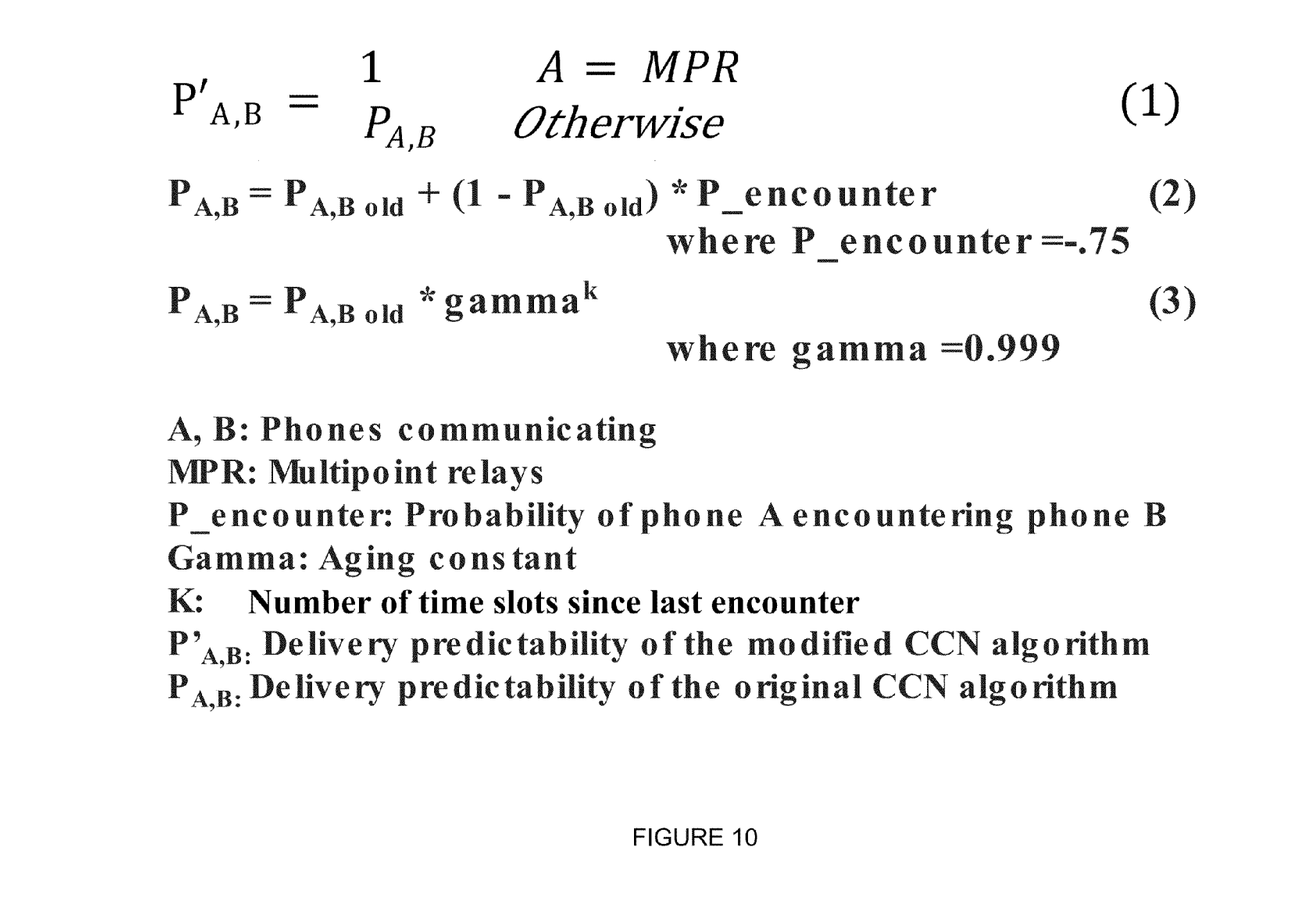
FIG. 10 shows the CCN routing algorithm.

The present embodiment utilizes a unique combination of these two approaches in determining the appropriate routing tables. First, the delivery predictability between nodes A and B (P(A,B)) is defined as 1 if node B is a MPR (multipoint relay) as determined by the OLSR protocol. Second, if node B is not a MPR, then the delivery predictability is defined as shown in equations 1-3 above. In one embodiment, P_encounter=0.75, gamma=0.999 and K=10, although different values are within the scope of the disclosure. FIG. 10 describes this CCN routing algorithm.

In addition, to interface the CCN layer to the MANET layer, several OLSR plugins were developed. These plugins communicated information from the MANET layer to the CCN layer, including:

- IP address of the 1-hop and 2-hop neighbors
- dynamically changing network topologies; and
- the state of a neighboring node (i.e. status as an MPR)

There are several advantages to passing this information from the MANET to the CCN. These benefits include:

- the CCN overlay can use this knowledge of 2 hop neighbors or topology to increase the efficiency of message dissemination. In other words, it doesn't need to broadcast messages/requests to all the nodes.
- The CCN overlays do not have to re-implement functionality such as link-sensing and neighbor discovery because OLSR already provides a more efficient implementation of these features.

The CCN layer interfaces with the MANET network layer. To test the effects of the proposed routing algorithm, several different algorithms were tested.

In one embodiment, the CCN layer was used with an open source version of Haggle. Haggle is a content-centric software application, allowing users to share information based on shared interests, rather than destination addresses. This version of Haggle utilizes ProPHET as its underlying routing algorithm. This algorithm is referred to as Haggle-CCN.

In a second embodiment, the CCN was overlaid on OLSR. Haggle's native PRoPHET algorithm was retained for forwarding messages. However, the link sensing and neighbor discovery algorithms from Haggle were removed, as these functions were already optimized in OLSR. This algorithm is referred to as Haggle-Overlay.

In the third embodiment, the CCN was again overlaid on OLSR. However, in this embodiment, the MPR/PROPHET algorithm described above was utilized. This algorithm is referred to as MPR-Overlay.

Performance testing of these various algorithms was performed, using the CCN applications (image sharing and file sharing). These performance tests were intended to demonstrate the advantages of the new MPR-Overlay routing algorithm. To understand the operation of the MANET, the Monitoring and Management Application was used to visualize the network in real time. In this way, 1-hop, 2-hops and all reachable nodes can be observed on a continuous basis.

In CCN testing, a variety of performance metrics can be evaluated. Some of these metrics include:

Delivery Ratio. Ratio of the number of messages published on a topic to the actual number of messages delivered to a MANET node that subscribes to that topic.

Delivery Time. Elapsed time between when a message is produced on a given topic to the time when it gets delivered to a subscriber of that topic.

Message Transparency. Binary evaluation of the ability of an intermediate node to forward a message without a need for subscribing to the message.

Message Transmission Distance. Number of hops a message can be transmitted across without a need for the intermediate nodes to subscribe to the message.

Control Traffic Overhead. Amount (in KB) of control message overhead incurred during a message transmission.

Total Network Traffic. Total number of information (both data and control message) (in KB) received by a node.

Figure 2A:
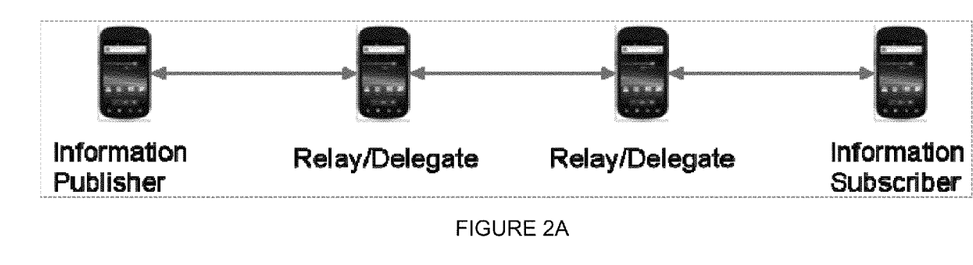
FIGS. 2A-C show various network topologies that may be used.
Figure 2B:
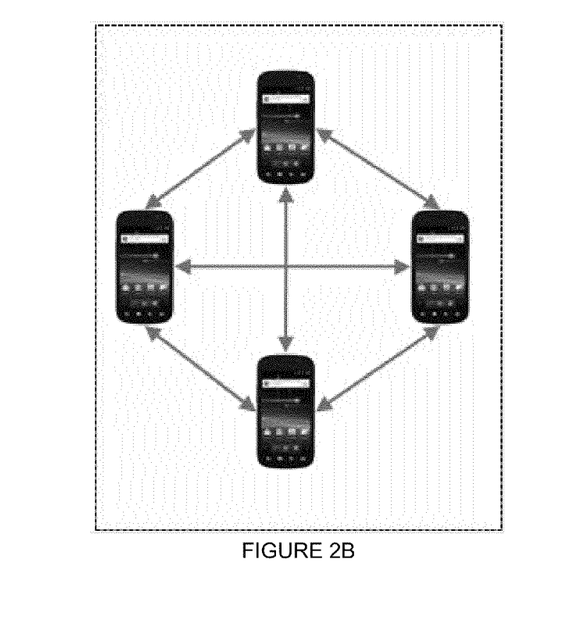
Figure 2C:
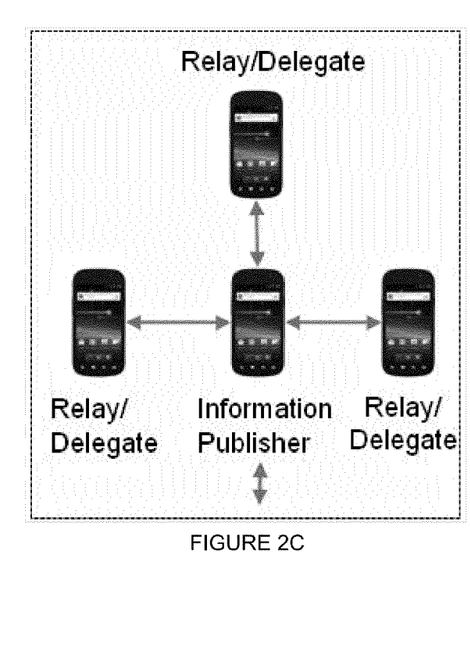

MANETs typically form in one of several configurations. The most common among these are shown in FIG. 2A-C. These topologies can be scaled to estimate real usage. In addition, each may represent best-case and worst-case scenarios for CCN algorithms.

FIG. 2A shows a linear topology which consists of linearly arranged modes. This topology implies that there is exactly one path that can be chosen for information dissemination from a publisher to a subscriber. Depending on the proximity of that subscriber, the path may include one or more hops. This topology may be used to compare delivery ratio, delivery time and delivery distance of the three embodiments enumerated above.

FIG. 2B shows a mesh topology. Mesh topologies are characterized in that there are multiple paths between any two nodes. In the topology shown in FIG. 2B, each node is connected to every other node. However, other mesh configurations are also possible. This configuration allows a comparison of the overhead costs, i.e. the volume of control messages that are sent in each embodiment.

FIG. 2C shows a star topology where the information publisher is connected to a plurality of MPRs. Each MPR node symbolizes the connection to multiple nodes that may or may not subscribe to the topics produced by the publisher. This topology highlights both the best and worst-case performance scenarios for MPR-Overlay. In the best case, all nodes connected to a MPR will subscribe to the information published thereby providing a high delivery ratio and low delivery time. In the worst case, none of the nodes connected to a MPR will be interested in the information produced by a publisher. Consequently, there will be increased network traffic due to unnecessary data transmissions in addition to the control message exchanges.

To test the various embodiments, an information publisher produced a 512 KB file every 15 seconds for 25 minutes, resulting in a total of 100 data objects. Each of the mobile devices was configured to use wireless communication, such as WiFi (IEEE 802.11 protocols), to communicate between devices.

Two different linear topologies (See FIG. 2A) were tested. The first included a 1-hop information dissemination where one node published information and the adjacent node consumed this information. This allows an estimate of the metric values for 1-hop communications. The second configuration comprised 2 hops. In other words, the information publisher and the consumer were separated by an intermediate node acting as a MPR. This configuration illustrates message communications over multiple hops.

Figure 3:
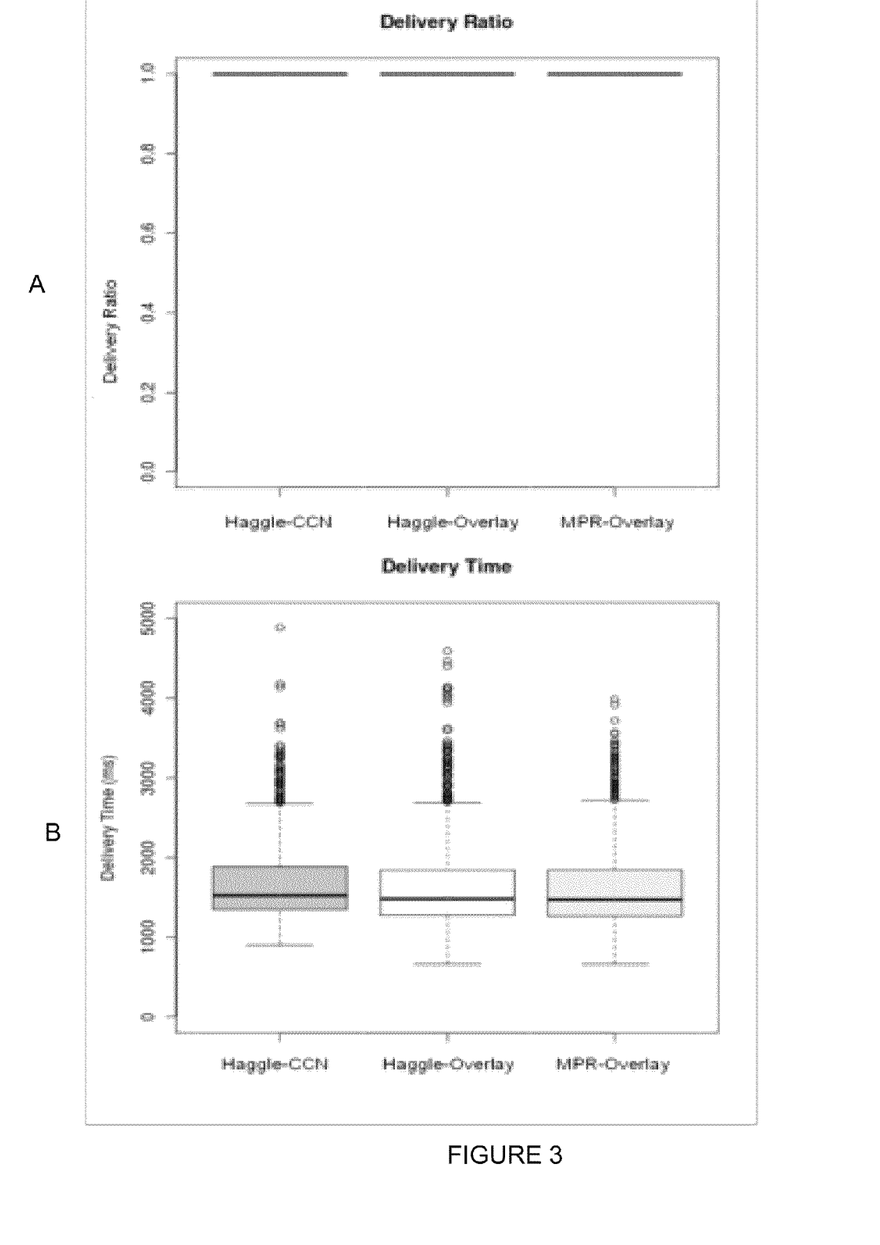
FIGS. 3A-B show delivery ratio and delivery time, respectively in a 1-hop linear network for various CCN algorithms.

FIGS. 3A-B show boxplots of delivery ratio and delivery time, respectively, when nodes exchange messages directly, and no MPR is needed. As shown in FIG. 3A, all three algorithms provided identical message delivery ratio. As shown in FIG. 3B, all showed a relatively similar median delivery time. Specifically, 100% delivery ratio for all the algorithms was observed. A median delivery time of 1522 milliseconds (ms) for Haggle-CCN, 1483 ms for Haggle-Overlay, and 1472 ms for MPR-Overlay was determined.

A 100% message delivery ratio indicates that all three algorithms perform identically when the message dissemination takes place only over a single hop. Likewise, almost identical median delivery time indicates that all three algorithms perform a similar set of actions—neighbor discovery and message dissemination. For neighbor discovery, Haggle-CCN periodically scans for live interfaces, and the overlay algorithms periodically broadcast Hello and Topology Control messages. For message dissemination, none of the algorithms selects a delegate, and Haggle-Overlay and MPR-Overlay do not need to choose MPRs.

Figure 4:
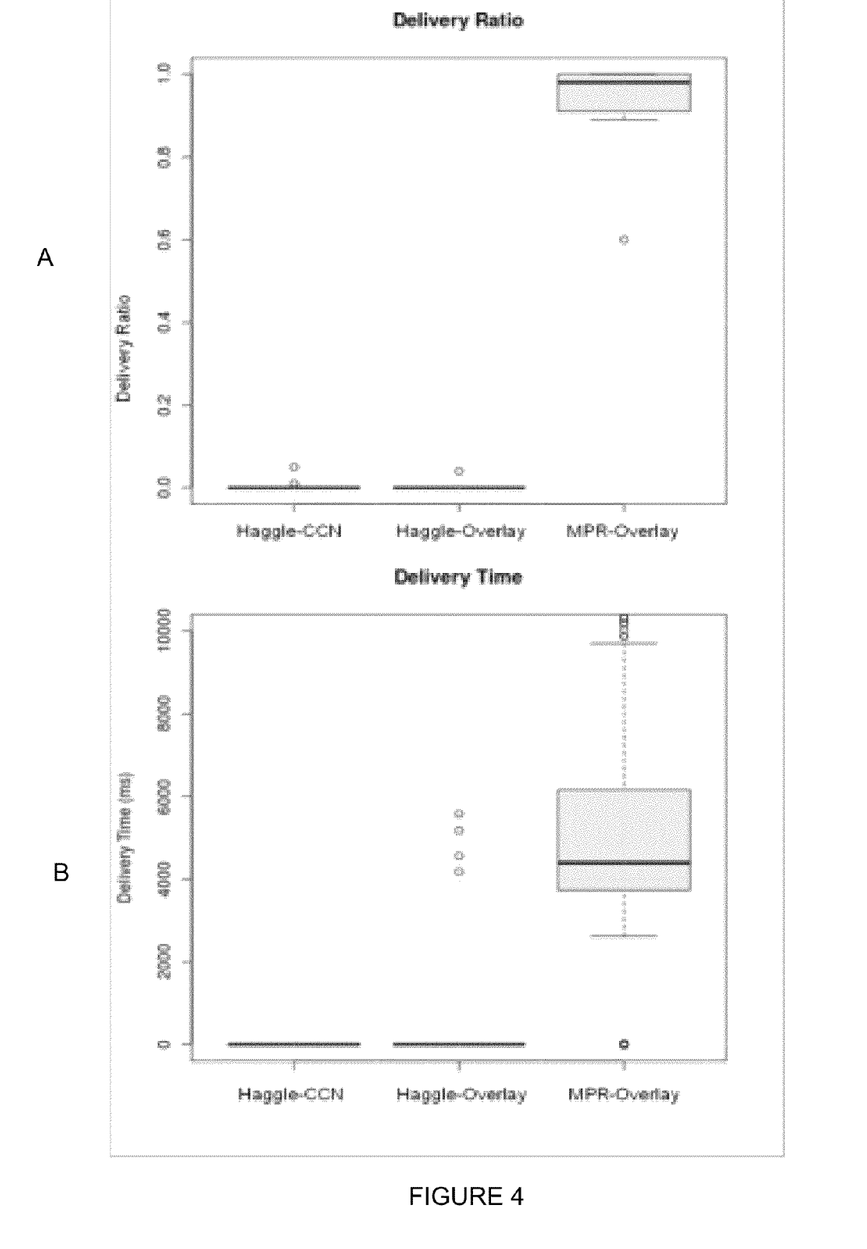
FIGS. 4A-B show delivery ratio and delivery time, respectively in a 2-hop linear network for various CCN algorithms.

FIGS. 4A-B depicts delivery ratio and delivery time, respectively, for nodes communicating over multiple hops. Referring to FIG. 4A, the MPR-Overlay provides a significantly higher delivery ratio of 91.75% median, compared to Haggle-CCN and Haggle-Overlay, both of which delivered almost no messages. Haggle-CCN provided a median of 0.06% and Haggle-Overlay provided a median of 0.04%. These low delivery ratios can be explained by the fact the candidate delegate (intermediate) nodes neither subscribed to any message from the producer nor increased their number of encounters with the subscriber and publisher by following the human mobility patterns, which may be a requirement for a higher delivery ratio for these algorithms.

Furthermore, as shown in FIG. 4B, MPR-Overlay uses a median of average delivery time of only 4.4 seconds. Delivery time of zero for Haggle-CCN and Haggle-Overlay indicates that these algorithms did not deliver information over multiple hops reliably.

Based on these results, MPR-overlay supports higher message transmission distance relative to the other algorithms. Furthermore, MPR-overlay also preserves message transparency over multiple-hops by virtue of design of the algorithm.

Figure 5:
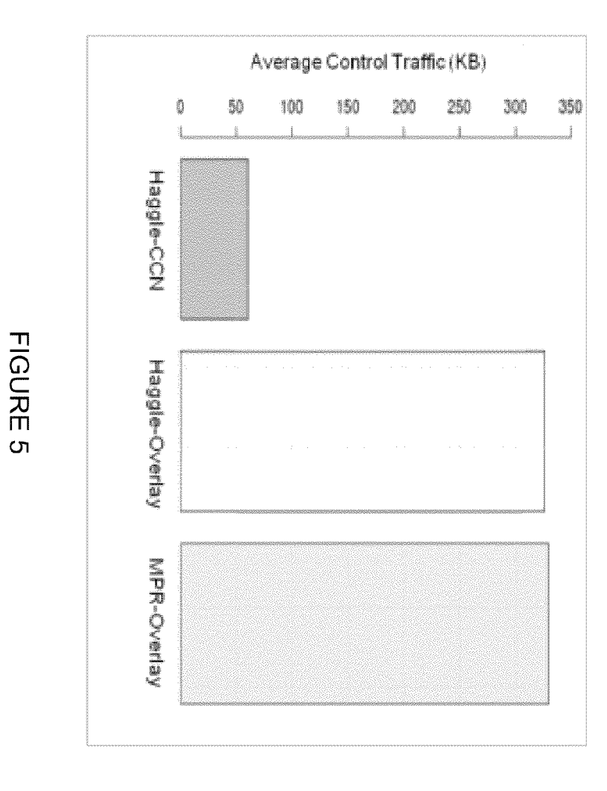
FIG. 5 shows the average control traffic in a mesh network for various CCN algorithms.

A test was then performed on the mesh topology shown in FIG. 2B. FIG. 5 shows the control traffic overhead associated with each algorithm. As shown in FIG. 5, Haggle-CCN produces 60.58 KB of control traffic, and Haggle-Overlay generates an average of 326.56 KB and MPR-Overlay generates 329.58 KB. That is, both of the overlay algorithms, MPR-Overlay and Haggle-Overlay, produce six times more control data compared to Haggle-CCN. This represents the cost associated with OLSR overhead.

Figure 6:
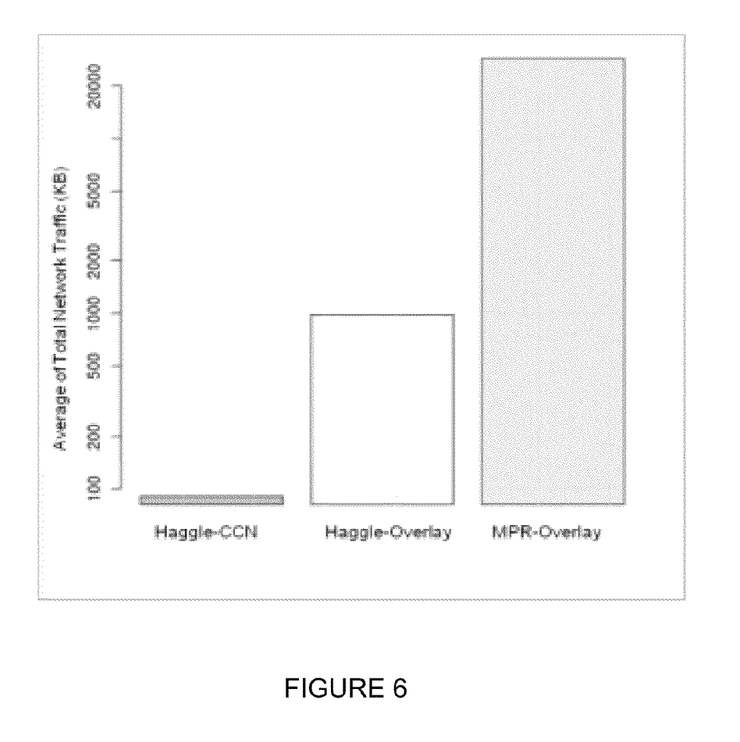
FIG. 6 shows total traffic in a star network for various CCN algorithms.

A performance test was also performed on the star topology of FIG. 2C. FIG. 6 summarizes the average network traffic. Again, MPR-Overlay generates the largest amount of the average network traffic (28501.54 KB), followed by Haggle-Overlay (986.32 KB), and Haggle-CCN (90.41 KB). The large amount of network traffic for MPR-Overlay is the sum of both the data and control traffic. The traffic on Haggle-CCN is similar to the control traffic as seen in the mesh topology because the neighbor nodes have not subscribed to the data.

Figure 9:
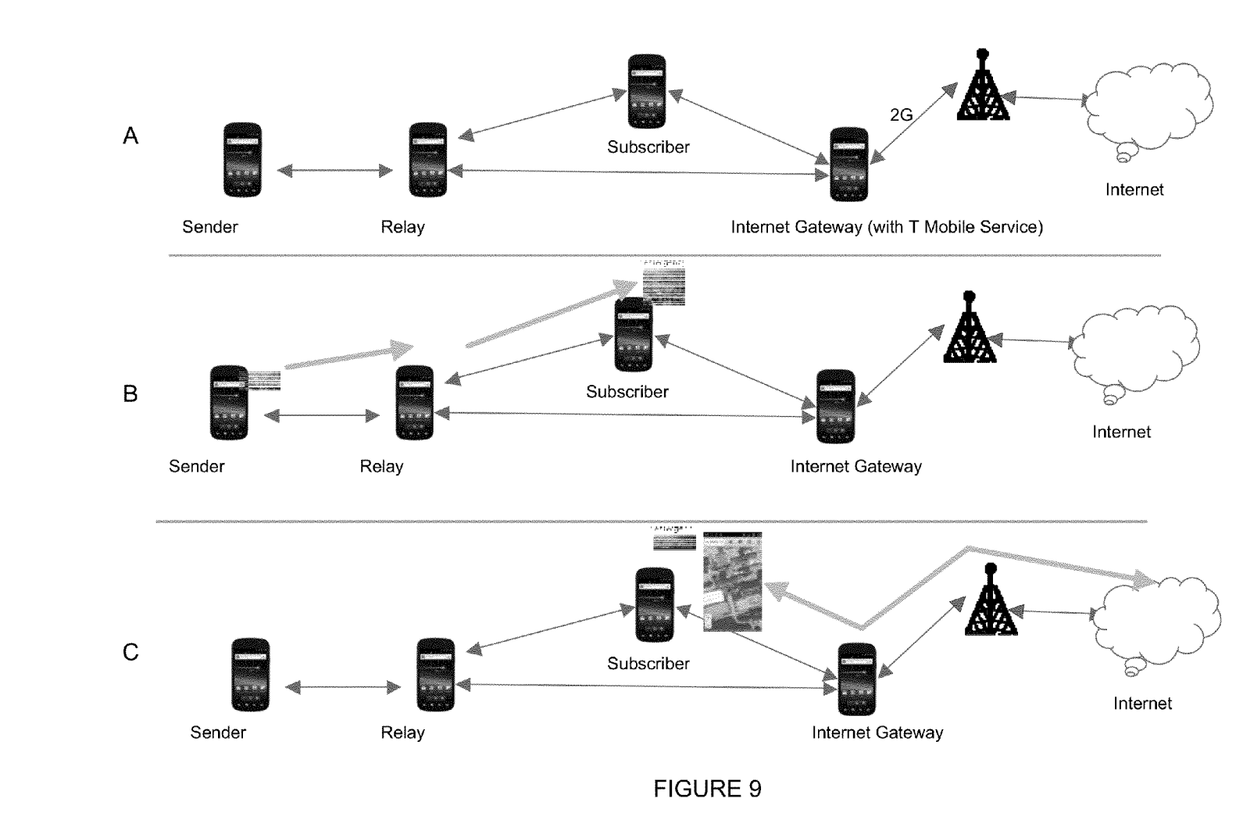
FIG. 9 shows routing of content-centric communications in an intermittent network.

FIG. 9 shows the operation of content-centric communications in an intermittent network. In FIG. 9A, a plurality of devices is shown. The node labeled "Subscriber" has previously registered an interest in content embedded with emergency attributes.

In FIG. 9B, the node labeled "Sender" takes a picture, or retrieves a stored image, assigns emergency attributes to it. In addition, the sender may also geo-tag the image. The sender then transmits the image. As shown in FIG. 9B, the image reaches the subscriber via multi-hop relays. While one node is shown between the "Subscriber" and the "Sender", additional nodes may be disposed between these two nodes. The image from the sender reaches the subscriber by traveling through the MANET.

In FIG. 9C, upon receiving the data of interest from the sender, the subscriber accesses a web-based utility, such as Google Maps to determine the geographic location of the source of the data in order to provide assistance. Note that, in this embodiment, the sender, the relay and the subscriber do not have direct access to the internet.

Returning to FIG. 1, note that in addition to the content-centric communications just described, the architecture also includes host-centric communications. As described above, these are communications with a specific destination, usually depicted by an IP address or a telephone number. When OLSR routes are not available, there are several techniques which can be used to find a specific destination node. Each of these is a variation of a store-and-forward approach.

Figure 7A:
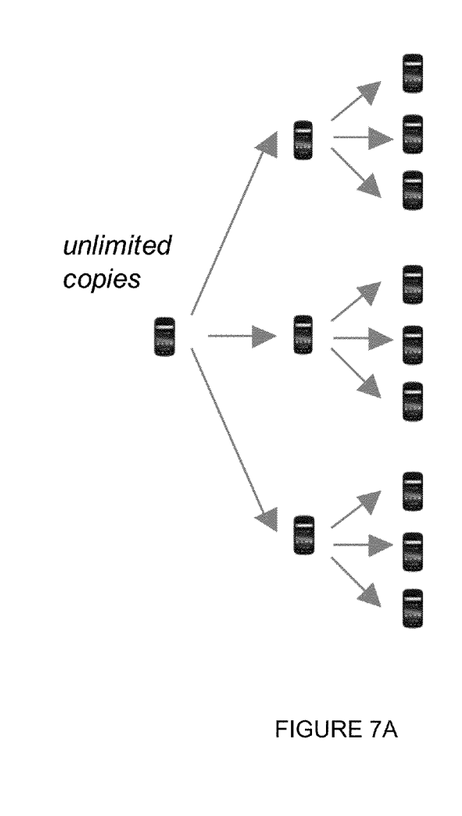
FIGS. 7A-C show various routing algorithms for host-centric communications.

FIG. 7A shows a first technique, referred to as epidemic routing. In this embodiment, the sender sends the message to any neighbor that does not already have a copy. Each node maintains a list of all messages that it has which are still pending. When a node encounters a new node, they exchange all messages that they do not have in common. This allows all messages to spread to all nodes in the network until the destination receives the message. This technique maximizes the probability that the destination will eventually receive the message. However, the overhead required for message transmission and storage is maximized in this approach.

Figure 7B:
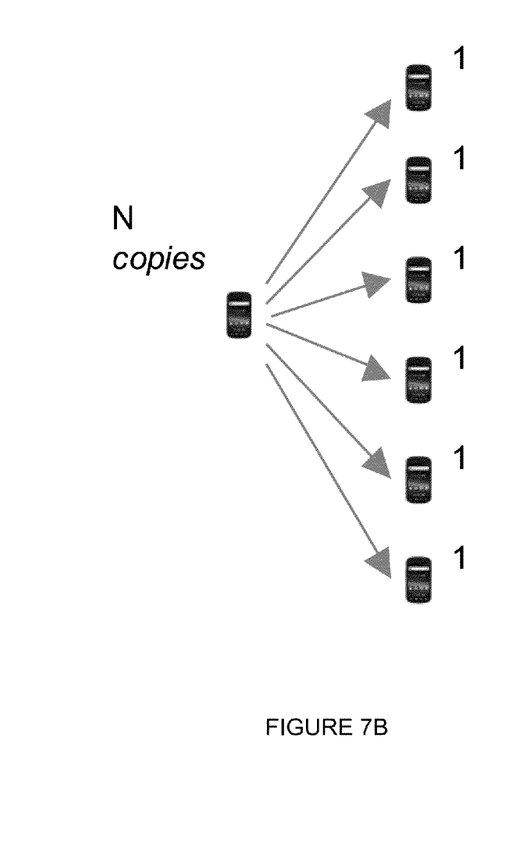

FIG. 7B shows a second technique, referred to as "spray and wait". In this embodiment, the sender of a message sends N messages to the first N neighbors that it encounters. Each of these neighbors holds the message until it encounters the destination. In other words, this algorithm assumes that at least one of the neighbors will come into contact with the destination. While this assumption may be flawed, the algorithm's benefit is that it has minimal overhead as the number of messages that enter the network is fixed in this configuration.

Figure 7C:
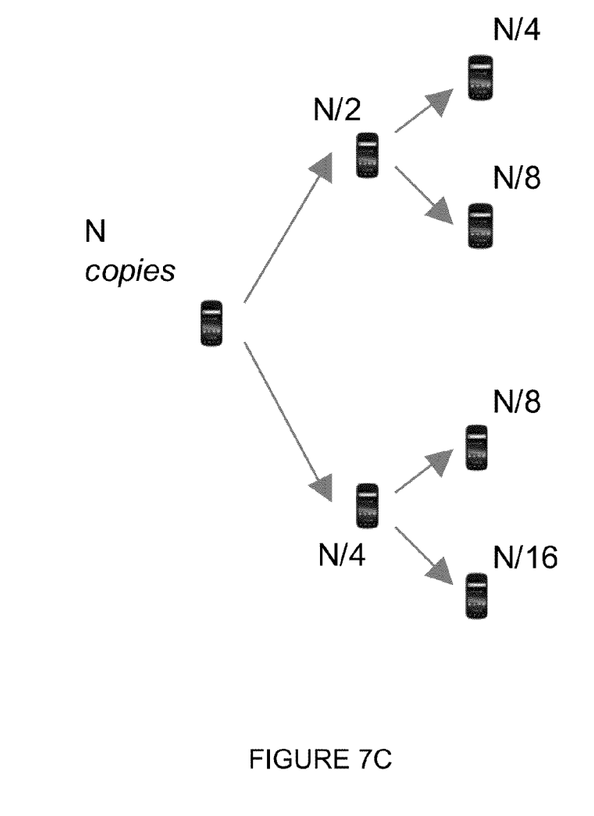

FIG. 7C shows a third technique, referred to as "binary spray and wait". In this embodiment, the sender has a number of copies of the message ("N"). To the first node that it encounters, it passes N/2 copies of this message. To the second node that it encounters, it passes N/4 copies of the message. This progression continues until the sender has only one copy of the message. At this point, it switches to direct transmission where this message is only transmitted if the sender encounters the destination node. Those nodes which received more than one copy of the message from the sender then repeat this process, giving half of their messages to the first node they encounter. This approach is a balance between the epidemic routing of FIG. 7A and the very limited routing of "spray and wait".

Implementations of each of these algorithms was designed for mobile devices using an Android smart phone as the illustrative mobile device.

Figure 8:
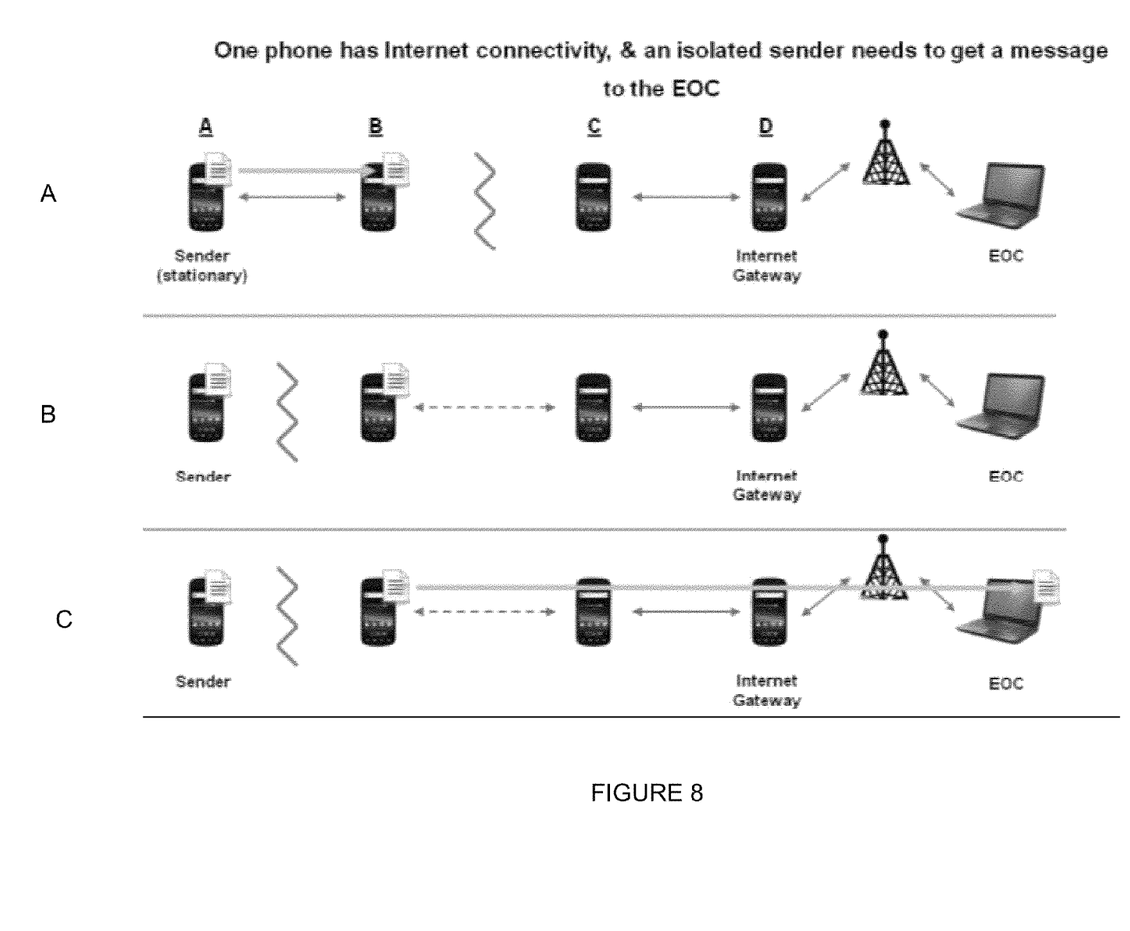
FIG. 8 shows routing of a host-centric communication in an intermittent network.

FIG. 8 shows the operation of a DTN in an intermittent mobile network. In FIG. 8A, the sender (Node A) is in communication with Node B, and sends the message, which is destined for the Emergency Operation Center (EOC), to Node B. At a later time, Node B encounters Node C, as shown in FIG. 8B, and relays the original message to Node C. At this time, Node A is not in communication with Node B or Node C, as shown by the zigzag line, and therefore is unable to forward this message itself to Node C. FIG. 8C shows Node C forwarding the message to Node D which has access to the internet. The message then reaches the destination, the EOC. In this embodiment, Nodes A and B and Nodes B and C encounter disconnections and disruptions. However, the message is handed between these nodes when they come in range of one another. In other words, Node B cannot send the message to Node C during FIG. 8A, since Node B and Node C are not within reach of each other. However, later, during FIG. 8B, this message can be transmitted.

Having described the mechanisms and algorithms used, a brief discussion of two use cases demonstrating the capabilities of DTN and CCN overlays follows. Smart phones or other communications devices are equipped with the software described in FIG. 1 and throughout this disclosure. As stated above, this software is stored in a storage element in the device and is executing by a processing unit in the device. This software now allows the device to communicate, using WiFi (IEEE 802.11), with other devices having similar or identical software.

In the first use case, a user may wish to send a message to a specific user or destination, such as an emergency number or family member. In this scenario, the DTN layer of the software interfaces with the MANET network layer to disseminate the message to one or more of the user device's neighbors. Depending on the routing algorithm used (i.e. epidemic, "spray and wait", "binary spray and wait"), the receiving node may continue to follow the message until it ultimately receives its destination, or reaches a device having internet connectivity, as shown in FIG. 8.

In the second use case, a user may want to transmit content or information widely, to anyone interested in this content. For example, the content may include metadata denoting that this is an emergency situation. Certain users, such as rescue and public safety officials, may have mobile devices that are configured to consume this type of content. Using the MPR-Overlay algorithm, the content is disseminated to neighboring devices until it reaches the safety officials. In some embodiments, the content may be tagged with location information allowing the public safety officials to locate the sender of the information.

Thus, the present disclosure provides a variety of novel elements. The disclosure defines an architecture that showcases both host and content-centric communications in a single device. Furthermore, this architecture has been tested in a real field environment, using a plurality of smart phones. The design of the architecture provides a framework for the development of any other application. Thus, others can develop their own applications to layer on this architecture as desired. Finally, while the concept of MANET has been previously disclosed, the present invention extended it (OLSR) to enable any user to access the internet via DTN and CCN Overlays on MANET as long as any one device as access to the Internet. FIGS. 8 and 9 both show the ability for a node to access the internet after first sending a message to another node via a multi-hop relay.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. These other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A mobile device for use with a mobile ad-hoc network (MANET), comprising:
   a processing element;
   a circuit allowing wireless communications using IEEE 802.11;
   a storage element, comprising instructions, which when executed by the processing element, allow said mobile device to engage in either host-centric or content-centric communications over said MANET, wherein the instructions cause the device to utilize different routing algorithms for the host-centric and content-centric communications, such that the device utilizes optimized link state routing (OLSR) protocol for content-centric communications to discover and disseminate link state information throughout the MANET, and utilizes a variation of store-and-forward to transmit messages through the MANET for host-centric communications.

2. The mobile device of claim 1, wherein said device utilizes Probabilistic Routing Protocol using History of Encounters and Transitivity (PRoPHET) routing for said content-centric communications.

3. The mobile device of claim 2, wherein said device uses OLSR to identify multipoint relays, and uses PRoPHET to determine preferred routing paths, wherein said multipoint relays comprise most preferred paths.

4. The mobile device of claim 3, wherein delivery predictability between said device and a node is defined as a value between 0 and 1 based on a history of exchanges between said device and said node, and wherein said delivery predictability is defined as 1 if said node is identified as a multipoint relay by said OLSR protocol.

5. The mobile device of claim 1, wherein said device uses a binary spray and wait technique to transmit said messages for host-centric communications.

6. A mobile device for use with a mobile ad-hoc network (MANET) comprising a plurality other mobile devices, comprising
   a processing element;
   a circuit allowing wireless communications using IEEE 802.11;
   a storage element, comprising instructions, which when executed by the processing element, allow the mobile device to select preferred routing paths, wherein said device:
      uses OLSR protocol to identify which of said other devices is a multipoint relay;
      uses PRoPHET to determined preferred routing paths among said other devices;
      designates said multipoint relays as most preferred paths; and
      transmits content over said MANET,
   wherein said device sends content to other devices based on said determined preferred routing paths.

7. The mobile device of claim 6, wherein delivery predictability between said device and one of said other devices is defined as a value between 0 and 1 based on a history of exchanges between said device and said other device, and wherein said delivery predictability is defined as 1 if said other device is identified as a multipoint relay by said OLSR protocol.

8. A mobile ad-hoc network (MANET), which allows delivery of content from a first mobile device, acting as a content source, to a remote destination having internet access, comprising:
   said first mobile device, wherein said first mobile device has IEEE802.11 wireless communication capability and does not have access to said internet;
   at least one intermediate mobile device, wherein a first intermediate mobile device is capable of receiving said content from said first mobile device and forwarding said content via said IEEE802.11 wireless communication;
   a second mobile device capable of receiving content from a intermediate device via said IEEE802.11 wireless communication, having access to said internet, wherein said second mobile device delivers said content to said destination over said internet.

9. The MANET of claim 8, comprising a plurality of intermediate mobile devices, wherein a third intermediate mobile devices is capable of transmitting to said second mobile and wherein a second intermediate mobile device receives said content from said first intermediate device and forwards said content to said third intermediate mobile device via IEEE802.11 wireless communication.

10. The MANET of claim 8, wherein said content is host-centric communication and is intended for said destination.

11. The MANET of claim 10, wherein said mobile devices utilize binary spray and wait to forward said content from said content source to said second mobile device.

12. The MANET of claim 8, wherein said content is content-centric communication.

13. The MANET of claim 12, wherein said mobile devices utilize OLSR protocol and PRoPHET protocol to route said content to said second mobile device.

14. The MANET of claim 8, wherein said content source creates content-centric communications and host-centric communications.

15. The MANET of claim 14, where each of said devices comprises mechanisms for routing said content to other devices, wherein different routing mechanisms are used for said host-centric communications and said content-centric communications.

* * * * *